(12) United States Patent
Mullins

(10) Patent No.: US 9,865,058 B2
(45) Date of Patent: Jan. 9, 2018

(54) THREE-DIMENSIONAL MAPPING SYSTEM

(71) Applicant: DAQRI, LLC, Los Angeles, CA (US)

(72) Inventor: Brian Mullins, Sierra Madre, CA (US)

(73) Assignee: DAQRI, LLC, Los Angeles, CA (US)

( * ) Notice: Subject to any disclaimer, the term of this patent is extended or adjusted under 35 U.S.C. 154(b) by 100 days.

(21) Appl. No.: 14/184,294

(22) Filed: Feb. 19, 2014

(65) Prior Publication Data

US 2015/0235474 A1 Aug. 20, 2015

(51) Int. Cl.
*G06T 19/00* (2011.01)
*G09G 5/00* (2006.01)
*G06T 7/00* (2017.01)

(52) U.S. Cl.
CPC ............ *G06T 7/004* (2013.01); *G06T 19/006* (2013.01)

(58) Field of Classification Search
CPC ............................... G06T 19/00; G06T 19/006
USPC .................................................. 345/419, 633
See application file for complete search history.

(56) References Cited

U.S. PATENT DOCUMENTS

| 7,610,558 B2 * | 10/2009 | Morita ................ G06T 19/006 463/32 |
| 2005/0021281 A1 | 1/2005 | Friedrich et al. |
| 2012/0101953 A1 * | 4/2012 | James ................ G06Q 10/10 705/317 |
| 2012/0116728 A1 | 5/2012 | Shear et al. |
| 2013/0038707 A1 | 2/2013 | Cunningham et al. |
| 2013/0321398 A1 * | 12/2013 | Howard ................ G06T 19/00 345/419 |
| 2014/0044305 A1 | 2/2014 | Scavezze et al. |

FOREIGN PATENT DOCUMENTS

WO   WO-2015126951 A1   8/2015

OTHER PUBLICATIONS

"International Application Serial No. PCT/US2015/016389, International Search Report dated May 20, 2015", 2 pgs.
"International Application Serial No. PCT/US2015/016389, Written Opinion dated May 20, 2015", 8 pgs.
"International Application Serial No. PCT/US2015/016389, International Preliminary Report on Patentability dated Jul. 21, 2016", 29 pgs.

(Continued)

*Primary Examiner* — Zhengxi Liu
*Assistant Examiner* — Yi Yang
(74) *Attorney, Agent, or Firm* — Schwegman Lundberg & Woessner, P.A.

(57) ABSTRACT

A survey application generates a survey of components associated with a three-dimensional model of an object. The survey application receives video feeds, location information, and orientation information from wearable devices in proximity to the object. The three-dimensional model of the object is generated based on the video feeds, sensor data, location information, and orientation information received from the wearable devices. Analytics is performed from the video feeds to identify a manipulation on the object. The three-dimensional model of the object is updated based on the manipulation on the object. A dynamic status related to the manipulation on the object is generated with respect to reference data related the object. A survey of components associated with the three-dimensional model of the object is generated.

17 Claims, 15 Drawing Sheets

(56) References Cited

OTHER PUBLICATIONS

"International Application Serial No. PCT/US2015/016389, International Preliminary Report on Patentability dated Feb. 16, 2016", 18 pgs.
U.S. Appl. No. 15/711,317, filed Sep. 21, 2017, Three-Dimensional Mapping System.

* cited by examiner

THREE-DIMENSIONAL MAPPING SYSTEM

TECHNICAL FIELD

The subject matter disclosed herein generally relates to the processing of data. Specifically, the present disclosure addresses systems and methods for generating a virtual model and providing a dynamic survey of components in relation to the virtual model.

BACKGROUND

A device can be used to generate and display data in addition to an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision, object recognition, and other complimentary technologies) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
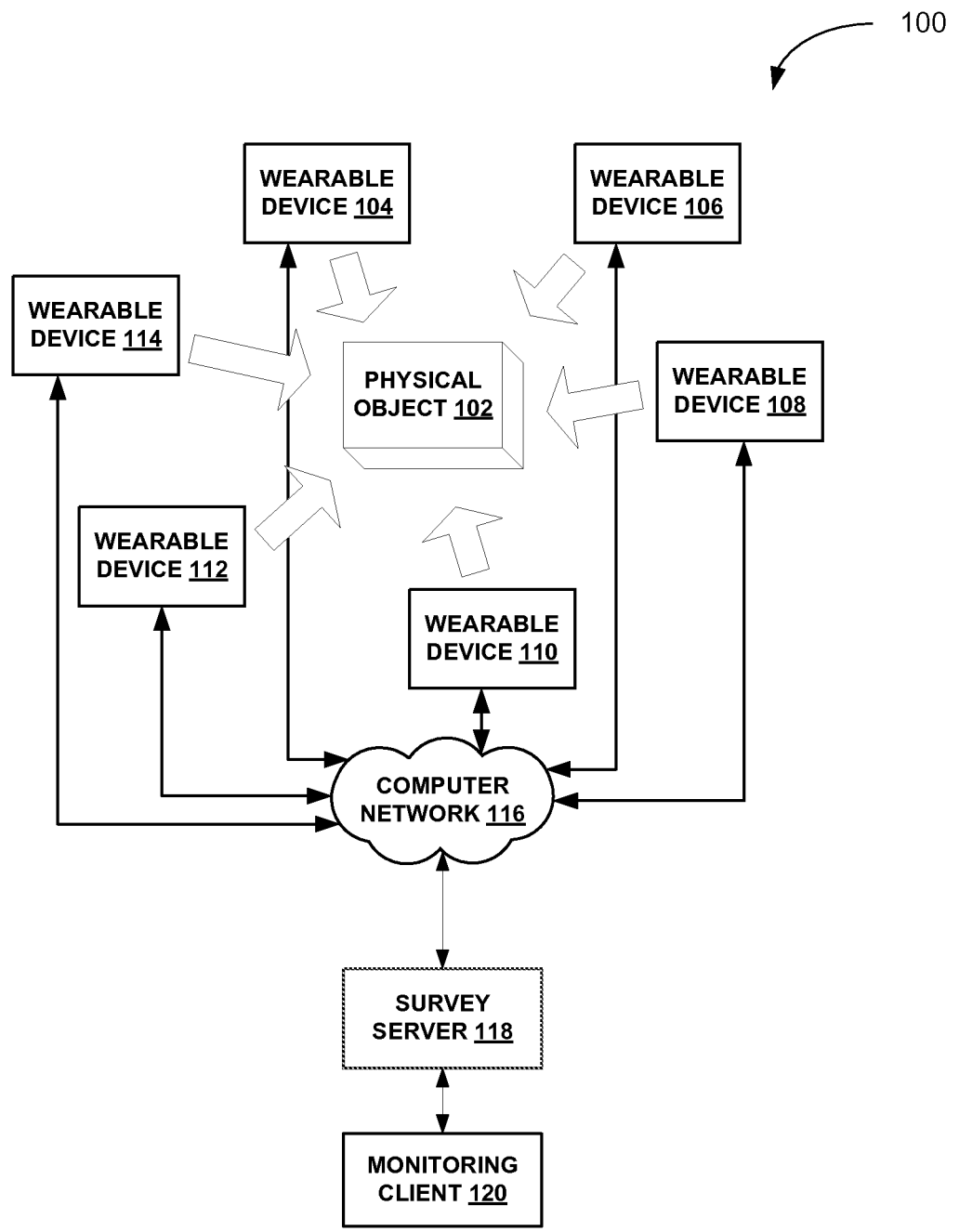
FIG. 1 is a block diagram illustrating an example of a network suitable for a mapping system, according to some example embodiments.

Example methods and systems are directed to data manipulation based on real world object manipulation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a three-dimensional virtual object overlaid on an image of a physical object captured by a camera of a wearable device. The physical object may include a visual reference that the augmented reality application can identify. A visualization of the additional information, such as the three-dimensional virtual object overlaid or engaged with an image of the physical object is generated in a display of the device. The three-dimensional virtual object may selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object, a two-dimensional virtual object. For example, the three-dimensional virtual object may include a three-dimensional view of a chair or an animated dinosaur. The two-dimensional virtual object may include a two-dimensional view of a dialog box, menu, or written information such as statistics information for a baseball player. An image of the virtual object may be rendered at the wearable device.

Multiple wearable devices (e.g., mobile devices that include a camera and a display) looking at a same physical object from different angles and locations may be further used to generate and reconstruct a three-dimensional of the physical object. A system and method for a survey system taking advantage of the multiple wearable devices is described. A survey application generates a survey of components associated with a three-dimensional model of the physical object. For example, the components may include nails on drywall, switches on a dashboard, buttons on a factory machine, a boat, or any industrial physical object. The survey application receives video feeds, location information, and orientation information from the wearable devices. The three-dimensional model of the object is generated based on the video feeds, location information, and orientation information received from the wearable devices. Analytics is performed from the video feeds to identify a manipulation on the object (e.g., a nail is being hammered in a wall, a button is switched on a dashboard). The three-dimensional model of the object is updated based on the manipulation on the object. A dynamic status related to the manipulation on the object is generated with respect to reference data related the object. A survey of components associated with the three-dimensional model of the object is generated.

In one example embodiment, the manipulation of the object comprises a modification of an existing component on the object (e.g., a switch on a wall), an addition of a new component to the object (e.g. a nail in a wall), or a removal of an existing component on the object (e.g., a handle from a door).

Object recognition is performed on the video feeds to identify a component on the object (e.g. nails on a wall). The dynamic status may include an identification of a type of manipulation or action on the object using key states or properties (e.g., unhammered nail, painted surface, gluing phase, hammering phase, etc.), an identification of a tool used in the manipulation on the object (e.g., hammer, saw, etc.), a location of the manipulation relative to the three-dimensional model of the object (e.g., nails hammered on the side panel of a boat), and an identification of the wearable device associated with the manipulation on the object (e.g, user of wearable device A is the one using the hammer).

Reference data may include a three-dimensional model of a reference object (e.g., boat, car, building), a reference process (e.g., phase 3 is to build the frame, phase 4 is install plumbing) for completing the reference object (e.g, a house), and a reference compliance related to the reference process (e.g, there should be four brackets or braces per beam, there should be one outlet per location or drywall).

In another example embodiment, the dynamic status related to the manipulation on the object is updated. The dynamic progress status may identify a completion status of the object with respect to the reference object. A non-compliance based on the manipulation on the object in relation to the reference compliance is identified. An inventory of components on the object is kept. A history of manipulations of the components and corresponding wearable devices are generated. Communication between two or more wearable devices determined based on the corresponding manipulation of the object is enabled.

In another example embodiment, the non-compliance of a first manipulation on the object is identified. A first wearable device corresponding to the first manipulation on the object is identified. A second wearable device associated with a second manipulation dependent on the first manipulation is identified. The second wearable device of the non-compliance of the first manipulation on the object is notified.

In another example embodiment, a first wearable device corresponding to a first manipulation on the object is identified. A second wearable device associated with a second manipulation similar to the first manipulation is identified. Communication between the second wearable device and the first wearable device in response to receiving a request for assistance on the first manipulation on the object from the first wearable device is enabled.

In another example embodiment, a request for a location of a component related to the manipulation on the object is received. The location of the component relative to the reference data is identified and communicated to the client. In another embodiment, the reference data may be obtained either actively through a direct upload or passively by using contextual data and non-task specific imagery to construct the models and data in question. In particular, a structured reference data includes a pre-combined models and inventories. An unstructured reference data may be collected through normal system use which can be interpreted on the fly, without anticipation of specific use cases or pre-existing constructs.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating a survey server in communication with wearable devices, according to some example embodiments. The network environment 100 includes wearable devices 104, 106, 108, 110, 112, 114, a monitoring client 120, and a survey server 118, communicatively coupled to each other via a computer network 116. The wearable devices 104, 106, 108, 110, 112, 114, a monitoring client 120, and a survey server 118 may each be implemented in a computer system, in whole or in part, as described below with respect to FIGS. 15 and 16. The server 118 may be part of a network-based system. For example, the network-based system may be or include a cloud-based server system that provides additional information, such as three-dimensional models and locations of components or items relative to the three-dimensional model, to the wearable devices 104, 106, 108, 110, 112, 114, and the monitoring client 120.

Each wearable device may be worn or held by a user working on the physical object 102. For example, the user may be a construction worker for a building. The user is not part of the network environment 100, but is associated with the corresponding wearable device. For example, each wearable device may be a computing device with a display such as a head mounted computing device with a display and a camera. The display and camera may be disposed on separate devices but may be communicatively connected. The computing device may be hand held or may be removable mounted to a head of the user. In one example, the display may be a screen that displays what is captured with a camera of the wearable device. In another example, the display of the device may be transparent such as in lenses of wearable computing glasses. In other examples, the display may be a transparent display such as a windshield of a car, plane, truck. The display may be non-transparent and wearable by the user to cover the field of vision of the user.

The wearable devices 104, 106, 108, 110, 112, 114 may be worn by users located at different locations around the physical object 102. For example, the physical object 102 may be a boat under construction while each wearable device may be mounted to the helmet of construction workers working the boat at a shipyard. The construction workers may be located at different locations around the boat. The construction workers may thus view different parts of the boat at the same time. The construction workers may be users of an application in the corresponding wearable device that allows them to augment their view of the boat with a virtual three-dimensional model of the completed boat. For example, the application may include an augmented reality application configured to provide the construction workers with an experience triggered by parts of the boat, a two-dimensional physical object (e.g., a marking on a door), a three-dimensional physical object (e.g., a statue located on an entrance), a location (e.g., main deck, port, starboard), or any visual or non-visual references (e.g., perceived corners of walls or furniture) in the real world physical environment. For example, the construction worker may point a camera of the corresponding wearable device to capture an image of the two-dimensional physical object. The image is tracked and recognized locally in the wearable device using a local database such as a context recognition dataset module of the augmented reality application of the wearable device. The local context recognition dataset module may include a library of virtual objects associated with real-world physical objects or references. The augmented reality application then generates additional information corresponding to the image (e.g., a three-dimensional model) and presents this additional information in a display of the wearable device in response to identifying the recognized image. If the captured image is not recognized locally at the wearable device, the wearable device downloads additional information (e.g., the three-dimensional model) corresponding to the captured image, from a database of the survey server 118 over the network 116.

The wearable devices 104, 106, 108, 110, 112, 114 may be used to capture video and images from different angles of the physical object 102. Other sensor data may be captured such as data generated by structured light. In one example embodiment, the wearable devices 104, 106, 108, 110, 112, 114 may broadcast a video feed of what the corresponding users are looking at to the survey server 118. In another example, the wearable devices 104, 106, 108, 110, 112, 114 capture frames or images at periodic intervals and broadcast them to the survey server 118. In another example, the wearable devices 104, 106, 108, 110, 112, 114 broadcast images at regular intervals and/or based on their geographic location relative to each other and to the physical object 102. For example, images may be captured in a sequential pattern such as clockwise or counter-clockwise around the physical object 102. Other examples include combination of image capture from wearable devices 104, 108, and 112 and video feed from wearable devices 106, 110, and 114. The pattern of video/image capture may alternate based on movement, location, orientation of each wearable device. For example, if the wearable device is looking away from the physical object 102, the rate of capture may be decreased or no image may be captured. In another example, if some of the wearable devices are located closer to each other relative to the proximity between the remaining wearable devices, the wearable devices that detect that they close to each other may capture and broadcast video/images at a lower rate. Similarly, wearable devices that are relatively more distant from other wearable devices may capture and broadcast video/images at a higher rate.

The data (image data using a camera, location data using GPS or wifi, orientation data using an accelerometer) receives from the wearable devices 104, 106, 108, 110, 112, 114 may be used to reconstruct and generate a three-dimensional model of the physical object 102. For example, data captured with the wearable devices worn on construction workers at a shipyard may start capturing images/video as soon as they are in proximity to the boat being built or when a distance or radius threshold is crossed. Two-dimensional images from different angles and locations around the boat may be used to reconstruct a three-dimension model of the boat being built using common computer vision systems with three-dimensional object recognition algorithms. The three-dimensional reconstruction model may be actively as an automatic post-processing step or on pull as actively related to a new query or equation introduced into the system well after the original data capture took place.

Furthermore, the data received from the wearable devices 104, 106, 108, 110, 112, 114 may be provided to a computer vision object recognition system for filing and identifying objects in images and video frames. In one embodiment, the object recognition system may be part of the survey server 118. As such, the data from the wearable devices 104, 106, 108, 110, 112, 114 may be used to reconstruct a three-dimensional model of the physical object 102 but also to keep a survey or an inventory of recognized objects. For example, the survey server 118 may keep track of how many nails have been put in a panel on the east side of the boat, who last used a hammer, when the hammer was used, and where the hammer was used. The survey system 118 may also be used to compare the three-dimensional model of the physical object 102 being built or worked on with the three-dimensional completed model of the physical object 102. In another example, the survey system 118 may be used to identify or alert a wearable device based on a compliance detected based on the data received from the wearable device and a reference data. For example, the survey server 118 may detect that nails were hammered in a wrong location based on the reference data and notify the user of the corresponding wearable device.

In one example embodiment, a wearable device may wish to offload some processes (tracking and rendering of virtual objects to be displayed in the wearable device) using the tracking sensors and computing resources of the survey server 118. The tracking sensors may be used to track the location and orientation of the wearable device externally without having to rely on the sensors internal to the wearable device. The tracking sensors may be used additively or as failsafe/redundancy or for fine tuning. The tracking sensors may include optical sensors (e.g., depth-enabled 3D camera), wireless sensors (Bluetooth, wifi), GPS sensor, biometric sensors, and audio sensor to determine the location of the user having the wearable device, distance of the user to the tracking sensors in the physical environment (e.g., sensors placed in corners of a venue or a room), the orientation of the wearable device to track what the user is looking at (e.g., direction at which the wearable device is pointed, wearable device pointed towards a player on a tennis court, wearable device pointed at a person in a room).

The computing resources of the survey server 118 may be used to determine and render virtual objects based on the tracking data (generated internally with wearable device or externally with the tracking sensors). The augmented reality rendering is therefore performed on the survey server 118 and streamed back to the corresponding wearable device. As such, the wearable device does not have to compute and render any virtual object and may display the already rendered virtual object in a display of the wearable device. For example, the augmented reality rendering may include a location of where a handle is to be installed per architectural specifications or city code.

In another embodiment, data from the tracking sensors may be used for analytics data processing at the survey server 118 for analysis on usage and how the user is interacting with the physical environment. For example, the analytics data may track at what the locations (e.g., points or features) on the physical or virtual object the user has looked, how long the user has looked at each location on the physical or virtual object, how the user held the wearable device when looking at the physical or virtual object, which features of the virtual object the user interacted with (e.g., such as whether a user tapped on a link in the virtual object), and any suitable combination thereof. The wearable device receives a visualization content dataset related to the analytics data. The wearable device 200 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 12-14. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The computer network 116 may be any network that enables communication between or among machines (e.g., survey server 118), databases, and wearable devices. Accordingly, the computer network 116 may be a wired network, a wireless network (e.g., a mobile or cellular network), or any suitable combination thereof. The computer network 116 may include one or more portions that constitute a private network, a public network (e.g., the Internet), or any suitable combination thereof.

Figure 2:
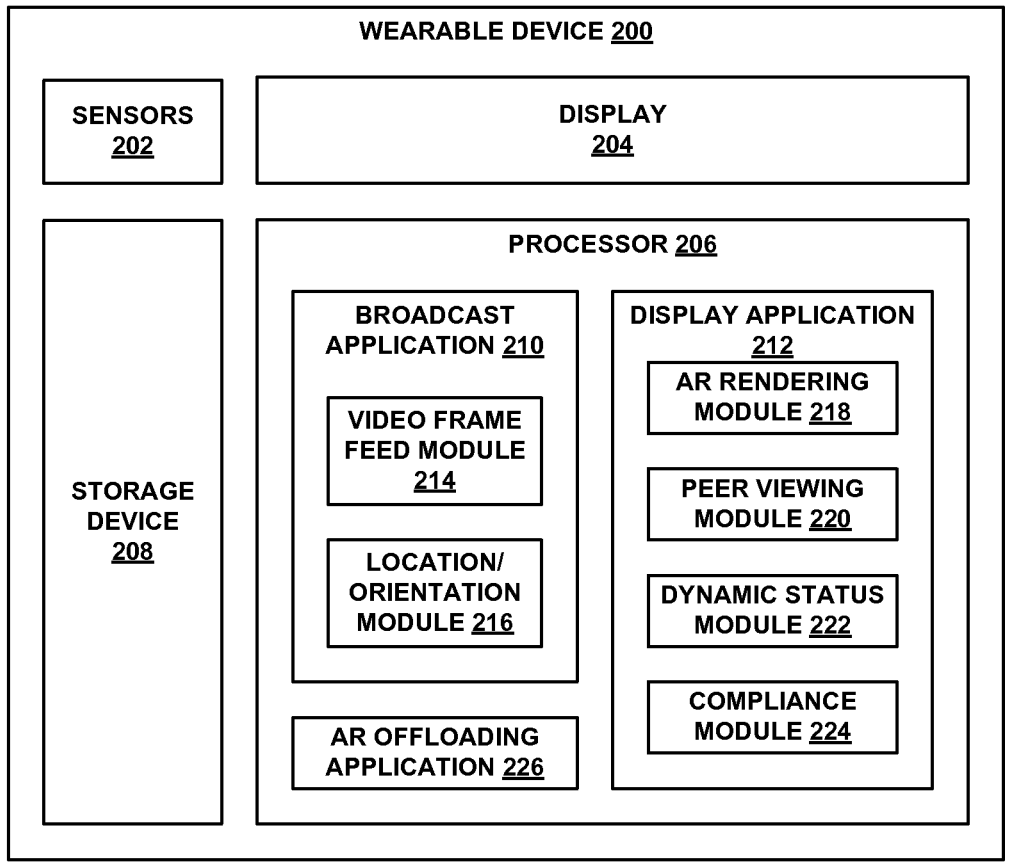
FIG. 2 is a block diagram illustrating an example embodiment of modules (e.g., components) of a wearable device.

FIG. 2 is a block diagram illustrating modules (e.g., components) of a wearable device 200, according to some example embodiments. The wearable device 200 may include sensors 202, a display 204, a processor 206, and a storage device 208. For example, the wearable device 200 may be a wearable computing device, a vehicle computer, a tablet computer, a navigational device, a portable media device, or a smart phone of a user. The user may be a human user (e.g., a human being), a machine user (e.g., a computer configured by a software program to interact with the wearable device 200), or any suitable combination thereof (e.g., a human assisted by a machine or a machine supervised by a human).

The sensors 202 may include, for example, a proximity or location sensor (e.g., near field communication, GPS, Bluetooth, Wifi), an optical sensor (e.g., camera), an orientation sensor (e.g., gyroscope), an audio sensor (e.g., a microphone), or any suitable combination thereof. For example, the sensors 202 may include a rear facing camera and a front facing camera in the wearable device 200. It is noted that the sensors described herein are for illustration purposes and the sensors 202 are thus not limited to the ones described.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display).

The processor 206 may include a broadcast application 210, a display application 212, and an augmented reality (AR) offloading application 226. The broadcast application 212 may be configured to communicate data from the wearable device 200 to the survey server 118. For example, the broadcast application 212 may include a video frame feed module 214 and a location/orientation module 216. The video frame feed module 214 may be configured to send images and/or video frames captured using the camera from sensors 202. In another example, the video frame feed module 214 may be used to send a video feed based on video captured using the sensors 202. The location/orientation module 216 may be configured to determine the geographic location and the orientation of the wearable device 200. The geographic location may be determined using GPS, wifi, audio tone, light reading, and other means. The orientation may be determined using an internal compass and an accelerometer in the wearable device 200 to determine where the wearable device 200 is located and in which direction the wearable device 200 is oriented.

The display application 212 may be configured to generated augmented data in the display 204. The augmented data may include, for example, virtual objects renderings, peer viewing, dynamic status, and compliance information. In one embodiment, the display application 212 may include an augmented reality (AR) rendering module 218, a peer viewing module 220, a dynamic status module 222, and a compliance module 224.

The AR rendering module 218 may be configured to generate a virtual object in the display 214. The AR rendering module 218 may include a local rendering engine that generates a visualization of a three-dimensional virtual object overlaid (e.g., superimposed upon, or otherwise displayed in tandem with) on an image of a physical object captured by a camera of the wearable device 200 in the display 204 of the wearable device 200. For example, the virtual object may include virtual knobs located on a physical door to illustrate where the knob is to be installed. In another example, the virtual object may include colored wiring schematics. A visualization of the three-dimensional virtual object may be manipulated by adjusting a position of the physical object (e.g., its physical location, orientation, or both) relative to the camera of the wearable device 200. Similarly, the visualization of the three-dimensional virtual object may be manipulated by adjusting a position camera of the wearable device 200 relative to the physical object.

In one example embodiment, the AR rendering module 218 may retrieve three-dimensional models of virtual objects associated with a captured real world physical object. For example, the captured image may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object (e.g., an image that has been previously determined to correspond to the three-dimensional virtual object).

In one example embodiment, the AR rendering module 218 may include a manipulation module that identifies the physical object (e.g., a physical telephone), access virtual functions (e.g., increase or lower the volume of a nearby television) associated with physical manipulations (e.g., lifting a physical telephone handset) of the physical object, and generate a virtual function corresponding to a physical manipulation of the physical object.

The peer viewing module 220 may be configured to enable communication with a user of another wearable device. For example, the peer viewing module 220 may generate another display within the display 204 to show a video feed from the other wearable device. In an example scenario, the peer viewing module 220 may display a live video feed that shows how to run electrical wires. In another example, the peer viewing module 220 enables the ability to dynamically "mark up" or add information or other feedback onto the remote users display or through his/her other onboard feedback mechanisms (e.g., visual, audio, haptic).

The dynamic status module 222 may be configured to display the status of an activity related to one or more wearable devices. For example, the dynamic status module 222 may display that phase 2 of a project is completed based on the detection that all nails have been placed in the corresponding areas from the wearable devices.

The compliance module 224 may monitor compliance of actions and objects detected by the wearable devices. For example, the compliance module 224 may detect that some wirings are missing or that an outlet is missing from a wall and as such the installation does not conform to the architectural specifications or building codes.

The augmented reality offloading application 226 may orchestrate and determine which process to offload to the survey server 118. The rendering module 218 renders virtual objects based on what is being detected by the sensors 202. The rendering module 218 may also include a tracking module that generates internal tracking data of the wearable device 200 using the sensors 202 to determine what the wearable device 200 is capturing or looking at in the real physical world.

The AR offloading application 226 may offload a combination of tracking and rendering processes to the survey server 118. For example, the AR offloading application 226 may offload only the rendering process to the survey server 118 while still providing tracking data (using the sensors 202 internal to the wearable device 200) to the survey server 118. In another example, the AR offloading application 226 may offload only the tracking process to the survey server 118 while rendering virtual objects at the wearable device 200 using external tracking data provided to the wearable device 200. In another example, the AR offloading application 226 may offload both the rendering process and the tracking to the survey server 118. In another example, the AR offloading application 226 may offload a portion of the rendering process to the survey server 118 (e.g., the survey server 118 renders virtual objects A, B, and C and the wearable device 200 renders virtual objects D, E, and F based on predefined conditions. For example, virtual objects that require more computing resources for rendering may be rendered on the survey server 118 while virtual objects that require less computing resources for rendering may be rendered on the wearable device 200. In another example, virtual objects located in a central area of the display 204 may be rendered on the wearable device 200, while virtual objects location in a peripheral area of the display 204 may be rendered on the survey server 118 and streamed back to the wearable device 200. In another example, the AR offloading application 226 may adjust a visualization of the virtual objects based on an updated tracking data from the sensors 202. For example, the wearable device 200 is pointed at a chair. When the wearable device 200 receives the rendered virtual object from the survey server 118, the chair has moved. The AR offloading application 226 may then adjust a position of the rendered virtual object in the display 204 based on the last tracked position of the chair. Similarly, the AR offloading application 226 may adjust a visualization of the virtual objects based on an updated tracking data such as reference points (e.g., edges of an object, corners of a room) detected by sensors 202 and external tracking sensors.

The storage device 208 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the wearable device 200 relative to the picture of the shoe. Features of the three-dimensional virtual shoe may include selectable icons on the three-dimensional virtual model of the shoe. An icon may be selected or activated by tapping or moving on the wearable device 200.

In one example embodiment, the storage device 208 may include reference data such as a regulation code, city code, or compliance code to help detect whether the placement of recognized physical object satisfies the compliance code or the process plan. The storage device 208 may include a three-dimensional model of the completed physical object 202. For example, the three-dimensional model may include a three-dimensional model of a finished boat. The user of the wearable device can augment a user with a view of the final product superimposed on a display captured by the wearable device.

In another example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the survey server 118. The core set of images may include a limited number of images identified by the survey server 118. For example, the core set of images may include the images depicting covers of the ten most popular magazines and their corresponding experiences (e.g., virtual objects that represent the ten most popular magazines). In another example, the survey server 118 may generate the first set of images based on the most popular or often scanned images received at the survey server 118. Thus, the primary content dataset does not depend on objects or images scanned by the AR rendering module 218 of the wearable device 200.

The contextual content dataset includes, for example, a second set of images and corresponding experiences (e.g., three-dimensional virtual object models) retrieved from the survey server 118. For example, images captured with the wearable device 200 that are not recognized (e.g., by the survey server 118) in the primary content dataset are submitted to the survey server 118 for recognition. If the captured image is recognized by the survey server 118, a corresponding experience may be downloaded at the wearable device 200 and stored in the contextual content dataset. Thus, the contextual content dataset relies on the context in which the wearable device 200 has been used. As such, the contextual content dataset depends on objects or images scanned by the AR rendering module 218 of the wearable device 200.

In one embodiment, the wearable device 200 may communicate over the network 116 with the survey server 118 to retrieve a portion of a database of visual references, corresponding three-dimensional virtual objects, and corresponding interactive features of the three-dimensional virtual objects. The network 116 may be any network that enables communication between or among machines, databases, and devices (e.g., the wearable device 200). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
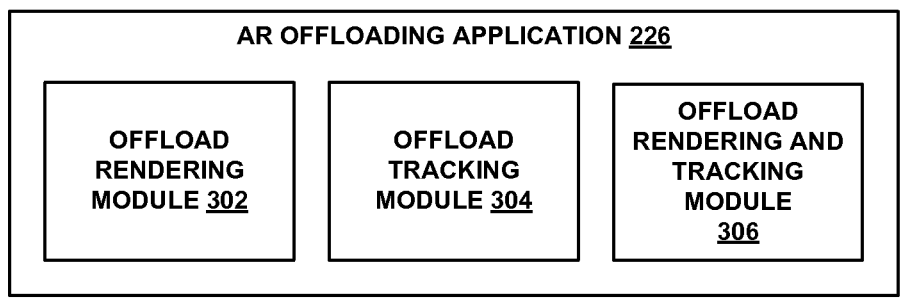
FIG. 3 is a block diagram illustrating an example embodiment of modules (e.g., components) of an augmented reality offloading application.

FIG. 3 is a block diagram illustrating modules (e.g., components) of the AR offloading application 226 of FIG. 2. The AR offloading application 226 may include an offload rendering module 302, an offload tracking module 304, and an offload and tracking module 306.

The offload rendering module 302 may be used to offload only the rendering process to the survey server 118 while still providing tracking data (using the sensors internal to the wearable device 200) to the survey server 118. For example, the offload rendering module 302 may send tracking data to the survey server 118. The survey server 118 determines which virtual object or information to render based on the tracking data provided by the wearable device 200. The survey server 118 renders the virtual object and sends the rendered virtual object to the wearable device 200. As such, the wearable device 200 does not have to use computing resources to render any virtual object.

The offload tracking module 304 may be used to offload only the tracking process to the survey server 118 while rendering virtual objects at the wearable device 200 using external tracking data provided to the wearable device 200. For example, the offload tracking module 304 may request the survey server 118 to track the location and position of the wearable device 200 using sensors external to the wearable device 200. The survey server 118 receives tracking data related to the wearable device 200 using sensors external to the wearable device 200. The survey server 118 communicates the external tracking data to the wearable device 200. The wearable device 200 renders a virtual object based on the external tracking data provided by the survey server 118. As such, the wearable device 200 does not have to use or enable its tracking sensors. In another example, the external tracking data may be compared with the wearable device 200 to calibrate the tracking sensors 112 external to the wearable device 200. In another example, the external tracking data may be used to augment internal tracking data generated by the wearable device 200 for further accuracy. An example scenario of using the offload tracking module 304 includes a construction worker walking into an entrance of a construction site. Sensors placed throughout the construction site may detect the precise location of the customer and the orientation of the wearable device 200 of the construction worker to determine items that the construction worker is looking at. So for example, the external tracking data may show that the construction worker is at the construction site A and is looking down the foundation, the wearable device 200 may display a virtual object such virtual steel beams that connect to the foundation.

The offload rendering and tracking module 306 may be used to offload both the rendering process and the tracking to the survey server 118. In such situation, the wearable device 200 uses the least amount of power because tracking data is not determined and virtual objects are not rendered locally. Both tracking data and virtual object rendering are performed at the survey server 118. The wearable device 200 acts as a streaming device to receive the rendered virtual object and to generate a visualization of the rendered virtual object in the display 204.

In one example, the AR offloading application 226 may offload a portion of the rendering process to the survey server 118 (e.g., the survey server 118 renders virtual objects A, B, and C and the wearable device 200 renders virtual objects D, E, and F based on predefined conditions. For example, virtual objects that require more computing resources for rendering may be rendered on the survey server 118 while virtual objects that require less computing resources for rendering may be rendered on the wearable device 200. In another example, virtual objects located in a central area of the display 204 may be rendered on the wearable device 200, while virtual objects location in a peripheral area of the display 204 may be rendered on the survey server 118 and streamed back to the wearable device 200.

In another example, the AR offloading application 212 may adjust a visualization of the virtual objects based on an updated tracking data from the sensors 202. For example, the wearable device 200 is pointed at a chair. When the wearable device 200 receives the rendered virtual object from the survey server 118, the chair has moved. The augmented reality offloading application 212 may then adjust a position of the rendered virtual object in the display 204 based on the last tracked position of the chair.

Figure 4:
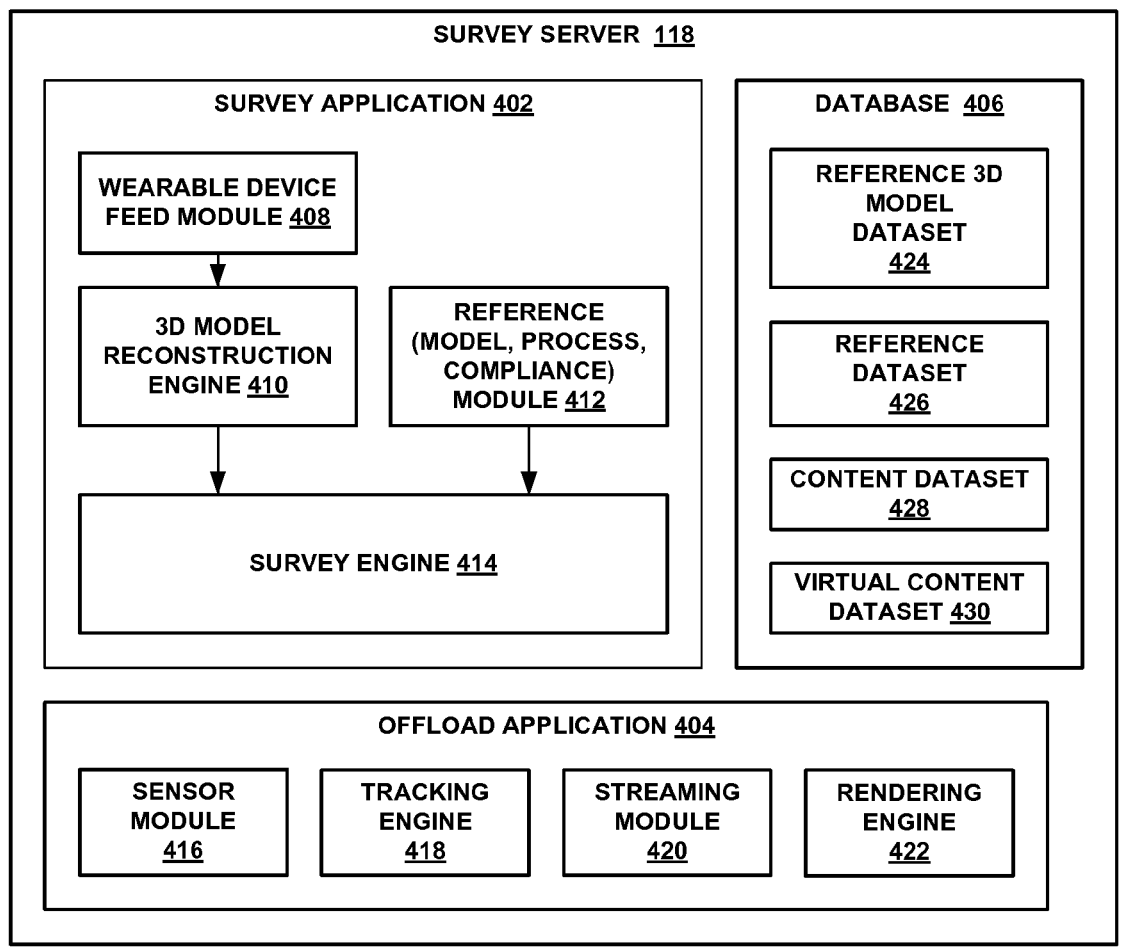
FIG. 4 is a block diagram illustrating an example embodiment of a survey server.

FIG. 4 is a block diagram illustrating modules (e.g., components) of the survey server 118. The survey server 118 includes a survey application 402, an offload application 404, and a database 406.

The survey application 402 may be configured to map and survey the physical object 102 so as to provide a dynamic or real time status related to the physical object 102. For example, the combined data from construction workers each having the wearable device 200 at a shipyard may be used to reconstruct a three-dimensional model of the ship or boat they are building. The three-dimensional model may be rendered at the survey server 118 and provided to the monitoring client 120. As such, an architect may see a dynamic 3D model of the ship being built. The 3D model may be rendered and provided as augmented information to the wearable devices. Furthermore, the data from the wearable devices may be used for object recognition and object tracking so as generate a dynamic status of who is working on what part of the ship, where they are, where the tools are, when they were last used, whether the construction worker complied with the specifications or codes.

In one example embodiment, the survey application 402 may include a viewing device feed module 408, a 3D model reconstruction engine 410, a reference module 412, and a survey engine 414. The viewing device feed module 408 may be configured to communicate with the wearable devices 104, 106, 108, 110, 112, 114 around the physical object 102 to receive image and/or video feed from them.

The 3D model reconstruction engine 410 may be configured to reconstruct a three-dimension model of the boat being built using common computer vision systems with three-dimensional object recognition algorithms from two-dimensional images from different angles and locations around the physical object 102. Furthermore, the data received from the wearable devices 104, 106, 108, 110, 112, 114 may be provided to a computer vision object recognition system for identifying and tracking objects in images and video frames.

The reference module 412 may be configured to access reference data from the database 406. The reference data may include a reference 3D model, a process on how to build the physical object 102, and a compliance reference such as city codes. For example, the reference module 412 may access tasks assigned for a particular construction worker, electrical schematics for an electrician working on the physical object 102, and a floorplan of the physical object 102.

The survey engine 414 may be configured to compare the reconstructed 3D model, track recognized objects and items, and compare the dynamic data with the reference to determine inventory status, compliance, and process. The survey engine 414 is described in more detail with respect to FIG. 5.

The offload application 404 may process offloaded from the wearable device 200 at the survey server 118. In one example embodiment, the offload application 404 may include a sensor module 416, a tracking engine 418, a rendering engine 422, and a streaming module 420. The offload application 404 may receive instructions from the wearable device 200 to offload a combination of the tracking process and the rendering process. In response, the offload application 404 generates commands to the corresponding engines 418, 420, and 422 based on the instructions.

The sensor module 416 may interface and communicate with tracking sensors to obtain data related to a geographic position, a location, and an orientation of the wearable device 200.

The tracking engine 418 may generate external tracking data based on the data collected from the sensor module 416 and the tracking sensors. In another embodiment, the tracking engine 418 may generate tracking data based on the data collected from sensors 202 of the wearable device 200.

The rendering engine 422 may generate a model of a virtual object to be rendered in the display 204 of the wearable device 200 based on a position of the wearable device 200 relative to the physical object. A physical movement of the physical object is identified from an image captured by the wearable device 200. The rendering engine 422 may also determine a virtual object corresponding to the tracking data (either received from the wearable device 200 or generated externally to the wearable device 200) and render the virtual object. Furthermore, the tracking data may identify a real world object being looked at by the wearable device 200. The virtual object may include a manipulable virtual object or displayed augmented information associated with such.

The streaming module 420 communicates the rendered virtual object back to the wearable device 200 such that the wearable device 200 does not have to render the virtual object. In one embodiment, the streaming module 408 may stream a portion of the rendered virtual object and let the wearable device 200 render the remaining portions of the virtual object that are not rendered or sent by the survey server 118.

The database 406 may store a reference 3D model dataset 424, a reference dataset 426, a content dataset 428, and a virtual content dataset 430. The reference dataset 426 may include references related to the physical object 102. The reference 3D model dataset 424 may include a 3D model of the completed physical object 102 and other objects related to the physical object 102. For example, the reference 3D model dataset 424 may include a 3D model of a completed ship, machine, or building. The reference dataset 426 may include, for example, building codes, schematics, maps, wiring diagrams, building process, inventory list of materials, specification of building materials, tools used in the process related to the construction of a building, expertise of each construction worker.

The content dataset 428 may store a primary content dataset and a contextual content dataset. The primary content dataset comprises a first set of images and corresponding virtual object models. The tracking engine 418 determines that a captured image received from the wearable device 200 is not recognized in the content dataset 428, and generates the contextual content dataset for the wearable device 200. The contextual content dataset may include a second set of images and corresponding virtual object models. The virtual content dataset 430 includes models of virtual objects to be generated upon receiving a notification associated with an image of a corresponding physical object.

Figure 5:
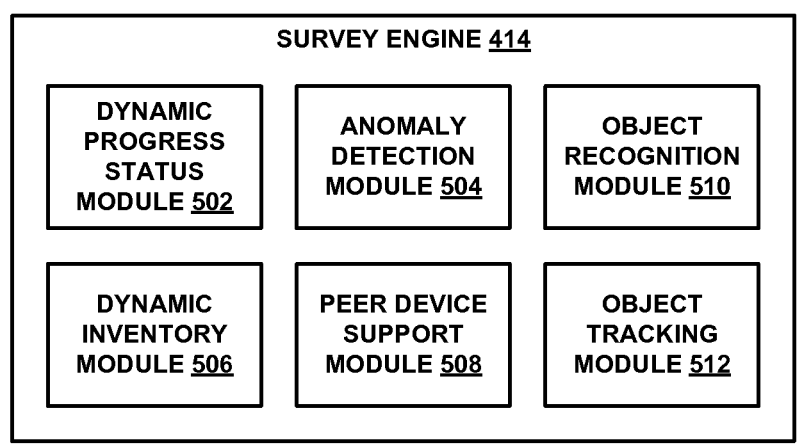
FIG. 5 is a block diagram illustrating an example embodiment of a survey engine.

FIG. 5 illustrates an example embodiment of the survey engine 414. The survey engine 414 may include a dynamic progress status module 502, an anomaly detection module 504, an object recognition module 510, a dynamic inventory module 506, a peer device support module 508, and an object tracking module 512.

The dynamic progress status module 502 may be configured to determine the status of an activity related to one or more wearable devices. For example, the dynamic status module 502 may determine that phase 2 of a project is completed based on the detection that all nails have been placed in the corresponding areas from the wearable devices. The dynamic progress status module 502 may use other parameters besides object or activity detection to determine the phase of a project. For example, if all wearable devices are located in key locations designated for protection from building blast, the dynamic progress status module 502 can infer that the construction phase relates to building demolition.

The anomaly detection module 504 may be configured to detect anomalies based on the data from the wearable devices and the reference data. The anomaly detection module 504 may monitor compliance of actions and objects detected by the wearable devices. For example, the anomaly detection module 504 may detect that some wirings are missing or that an outlet is missing from a wall and as such the installation does not conform to the architectural specifications or building codes. In another example, if a jack hammer is to be used at site A, and the anomaly detection module 504 determines that the recognized jack hammer is being used at site B, the anomaly detection module 504 may generate and issue an alert to the wearable devices. In yet another example, the anomaly detection module 504 detects that only five nails have been used instead of the prescribed ten nails as specified in a building code or an architectural plan. Once the anomaly is detected and identified, the anomaly detection module 504 generates an alert to the wearable device(s) corresponding to the five nails in the wall.

The object recognition module 510 performs object recognition algorithm on the video feeds and image feeds to identify objects captured from the wearable devices. The object tracking module 512 may be configured to track the recognized object. For example, the object recognition module 510 identifies a hammer and tracks the movements of the hammer used, for example, in hammering a panel.

The dynamic inventory module 506 generates a real time or dynamic inventory of recognized objects and manipulations of recognized objects from the video feeds. The dynamic inventory module 506 further associates an identification of the wearable device with the recognized objects and manipulations. As such, the dynamic inventory module 506 may keep track of where a hammer is located, who used the hammer, and when the hammer was used. The dynamic inventory module 506 may include a history of the inventory so that the monitoring client 120 can inquire the historical status of the hammer or the wearable devices. For example, a user can query the dynamic inventory module 506 to identify who did what at a particular point in time.

The peer device support module 508 may be configured to enable communication between the wearable devices. For example, the peer device support module 508 may connect a wearable device to another wearable device based on their task similarity or expertise.

Figure 6:
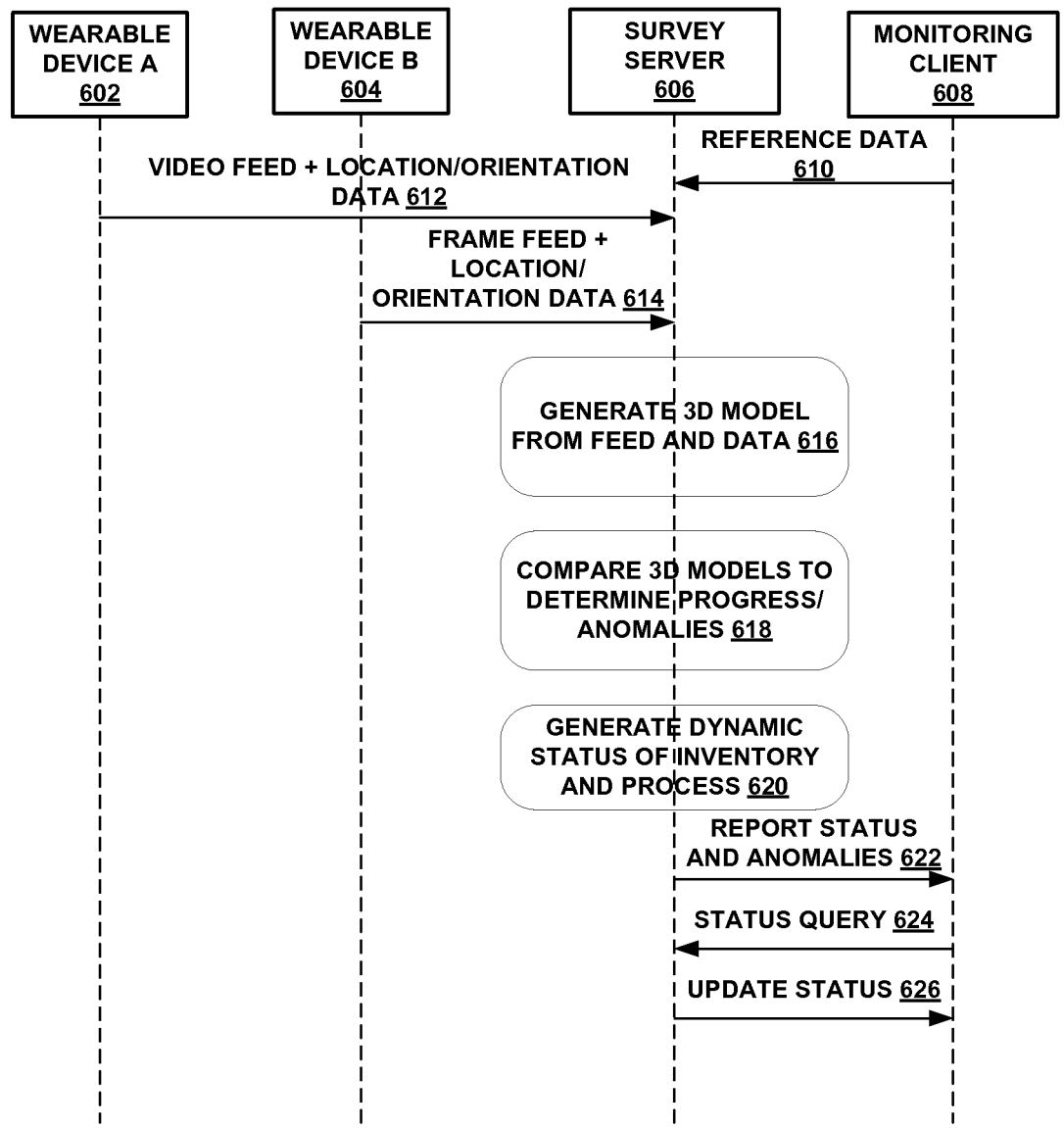
FIG. 6 is a ladder diagram illustrating an example embodiment of generating a dynamic status of inventory and process at a survey server.

FIG. 6 is a ladder diagram illustrating an example embodiment of generating a dynamic status of inventory and process at a survey server. At operation 610, the survey server 606 receives reference data from a monitoring client 608. At operation 612, a wearable device A 602 communicates data including video feed, location, and orientation to the survey server 606. At operation 614, a wearable device B 604 communicates data including video feed, location, and orientation to the survey server 606. At operation 616, the survey server 606 generates a 3D model based on the data received from wearable devices A and B. At operation 618, the survey server 606 compares the generated 3-D model based on the data received from the wearable devices A and B with the 3-D model from the reference data to determine the progress and any anomalies. At operation 620, the survey server 606 generates a dynamic status of the inventor and the process. At operation 620 to the survey server 606 generates a status report including anomalies to the monitoring client 608. At operation 624, the survey server 606 receives a status query from the monitoring client 608. At operation 626, in response to the status query from the monitoring client 608, the survey server 606 generates an updated status report to the monitoring client 608.

Figure 7:
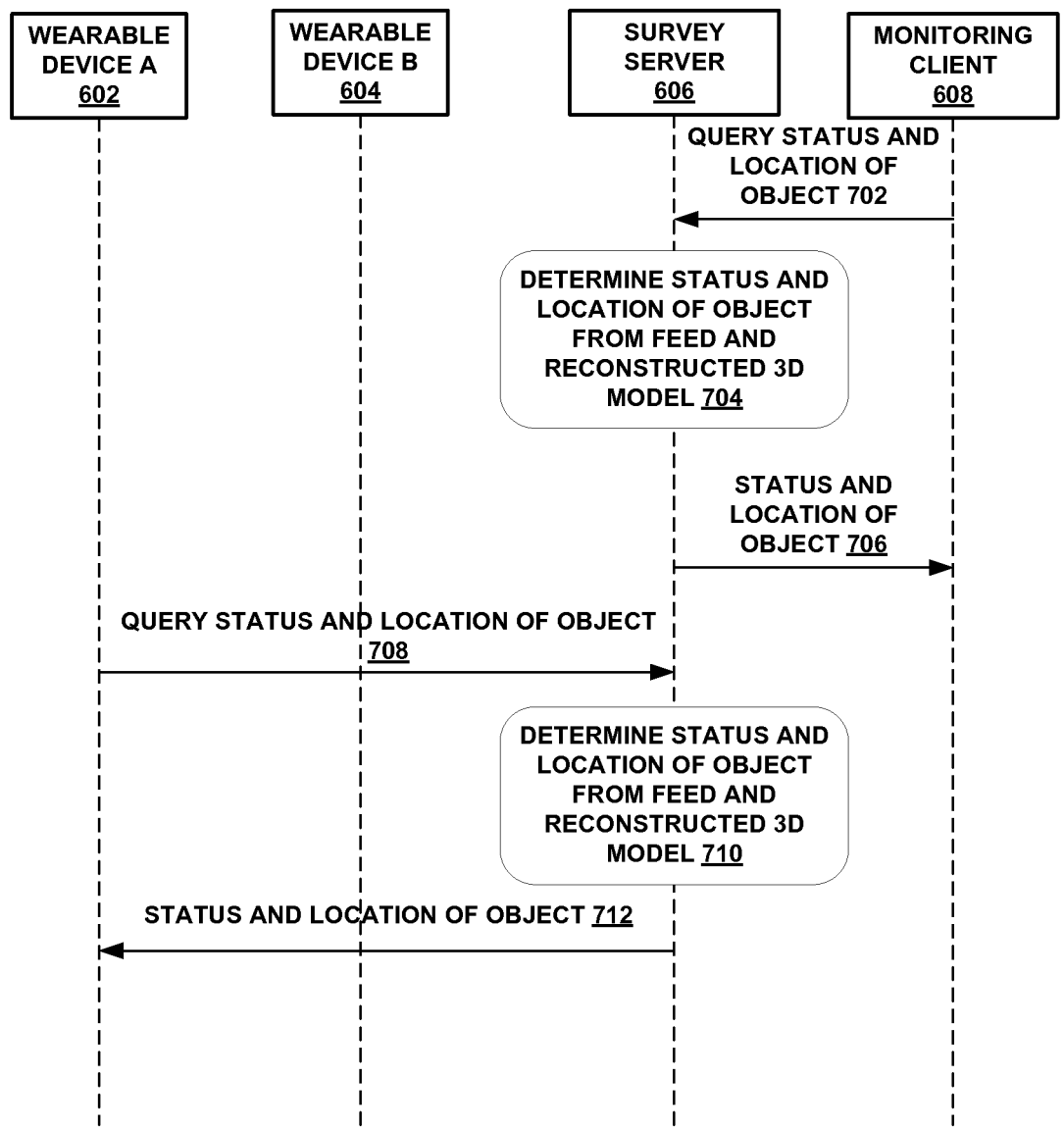
FIG. 7 is a ladder diagram illustrating another example embodiment of generating a dynamic status of inventory and process at a survey server.

FIG. 7 is a ladder diagram illustrating another example embodiment of generating a dynamic status of inventory and process at a survey server. At operation 702, the monitoring client 608 queries a status and location of an object at the survey server 606. At operation 704, the survey server 606 determines the status and location of the queried object from the video feed and reconstructed 3-D model. At operation 706, the survey server 606 communicates the status and location of the object to the monitoring client 608. At operation 708, the survey server 606 receives a query from the wearable device A 602 for the status and location of an object. At operation 710, the survey server 606 determines the status and location of the object from the video feed and reconstructed 3-D model. At operation 712, the survey server 606 sends the status and location of the object to the wearable device A 602.

Figure 8:
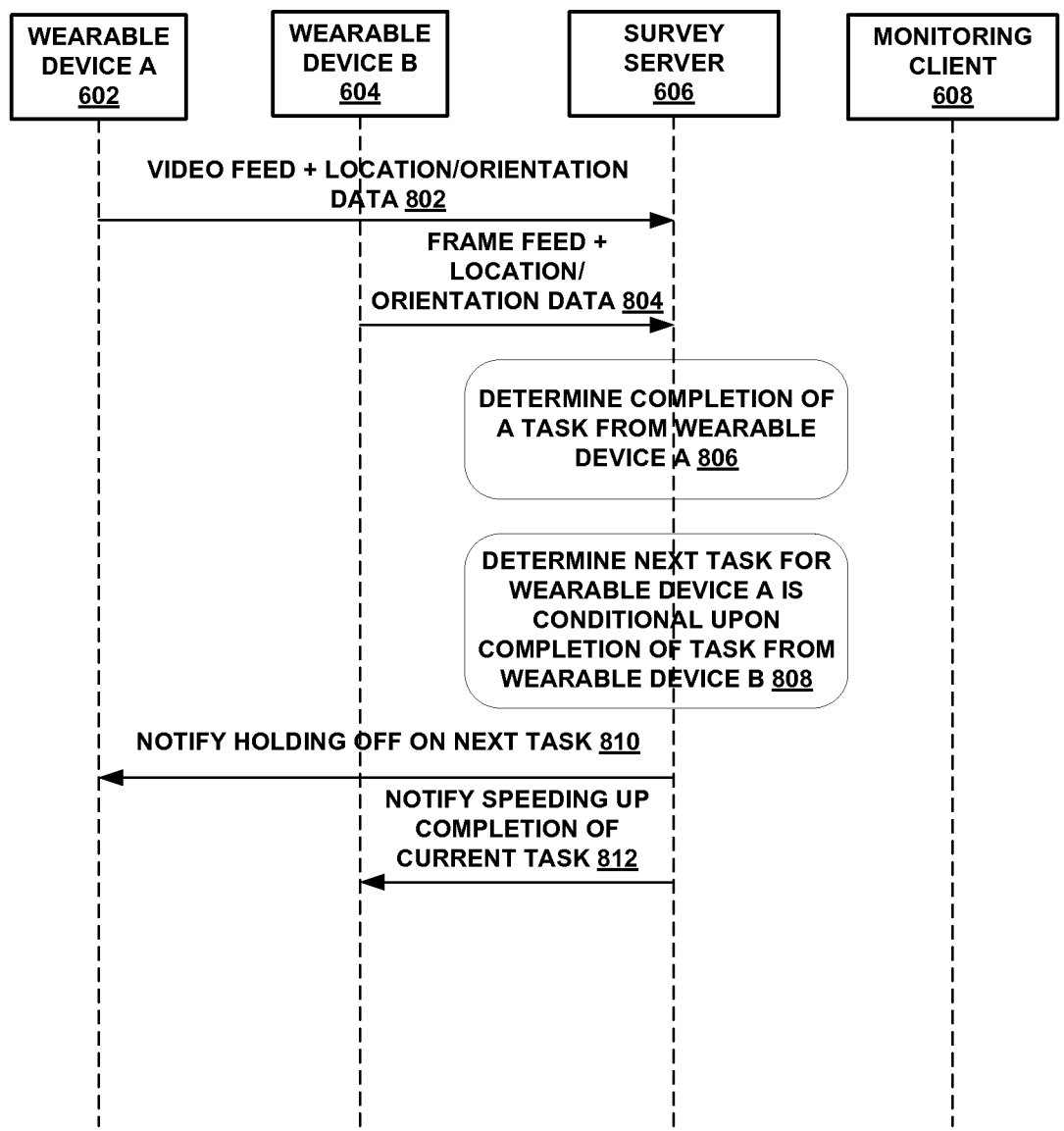
FIG. 8 is a ladder diagram illustrating an example operation of a task completion notification at a survey server.

FIG. 8 is a ladder diagram illustrating an example operation of a task completion notification at a survey server. At operation 802, the survey server 606 receives a video feed, location, orientation data from the wearable device A 602. At operation 804, the survey server 606 receives a video feed, location, orientation data from the wearable device B 604. At operation 806, the survey server 606 determines the completion of the task from the wearable device A. At operation 808, the survey server 606 determines that the next task for the wearable device is conditional upon completion of a task from the wearable device B. At operation 810, the survey server 606 notifies the wearable device A 602 to hold off on the next task. At operation 812, the survey server 606 notifies the wearable device B 604 to speed up completion of the current task.

Figure 9:
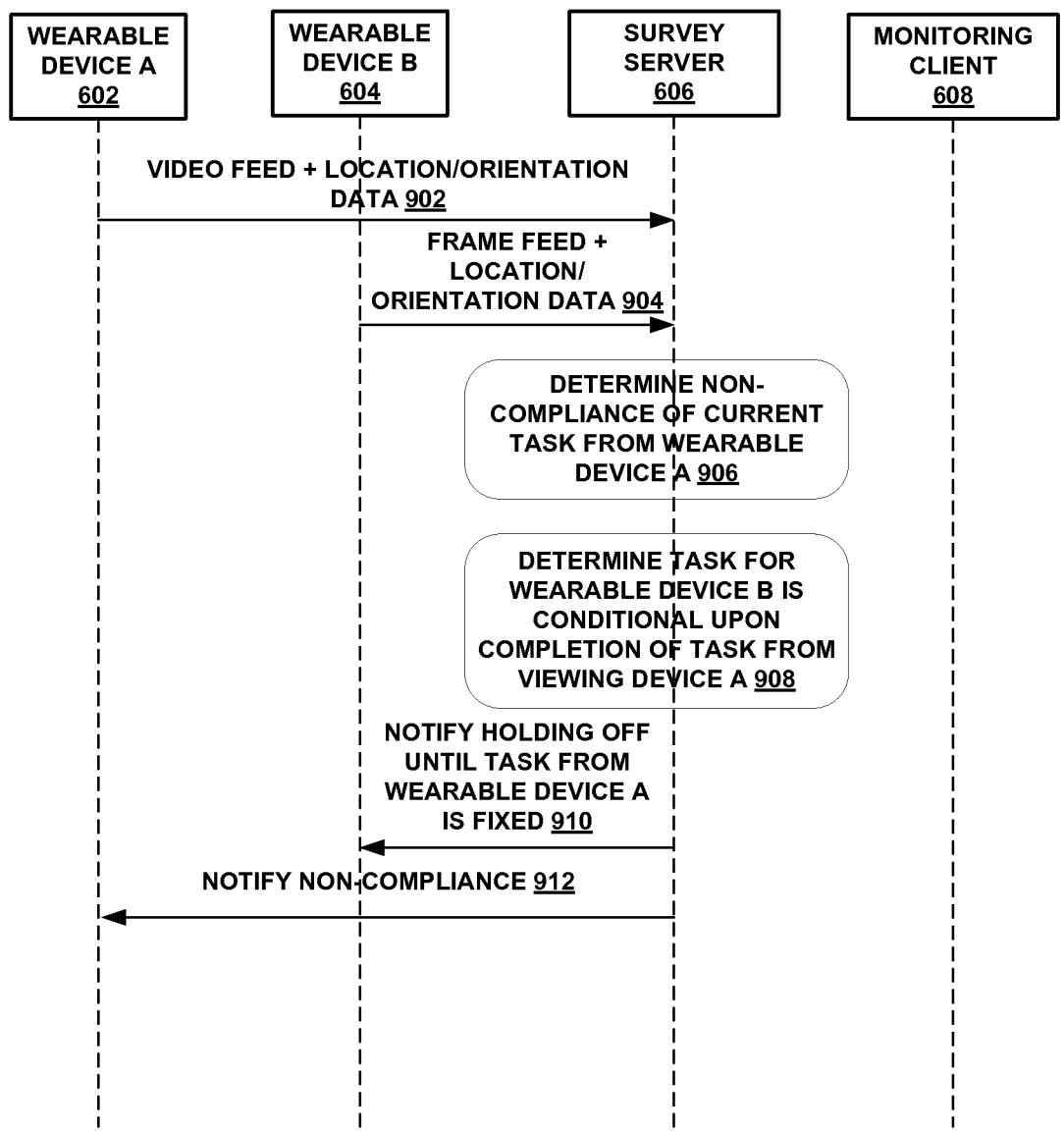
FIG. 9 is a ladder diagram illustrating an example operation of a notification of non-compliance at a survey server.

FIG. 9 is a ladder diagram illustrating an example operation of a notification of non-compliance at a survey server. At operation 902, the survey server 606 receives a video feed, location, orientation data from the wearable device A 602. At operation 904, the survey server 606 receives a video feed, location, orientation data from the wearable device B 604. At operation 906, the survey server 606 determines a noncompliance of a current task from the wearable device A 602. At operation 908, the survey server 606 determines that a task for the wearable device B 606 is conditional upon completion of a task from the viewing device A 908. At operation 910, the survey server 606 notifies the wearable device B 604 to hold off until the current task associated with the wearable device A 602 is remedied. At operation 912, the survey server 606 notifies the wearable device A 602 of non-compliance.

Figure 10:
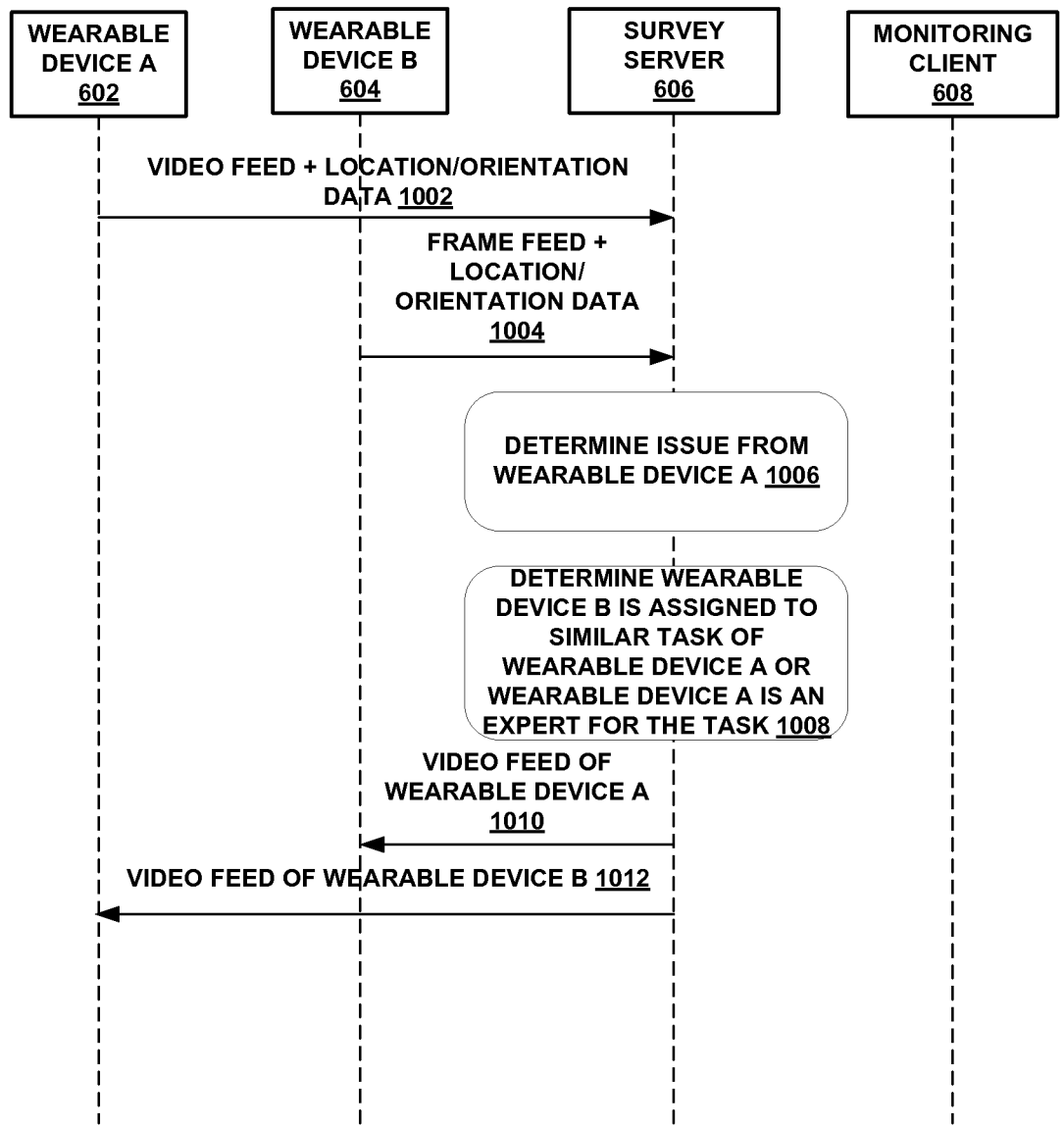
FIG. 10 is a ladder diagram illustrating an example operation of remote expert assistance.

FIG. 10 is a ladder diagram illustrating an example operation of remote expert assistance. At operation 1002, the survey server 606 receives a video feed, location, orientation data from the wearable device A 602. At operation 1004, the survey server 606 receives a video feed, location, orientation data from the wearable device B 604. At operation 1006, the survey server 606 determines an issue associated with the wearable device A 1006. At operation 1008, the survey server determines that wearable device B 604 is assigned to a task similar from the wearable device A 602, or the user of the wearable device A 602 is a known expert for the task. At operation 1010, the survey server 606 provides a video feed from the wearable device A 602 to the wearable device B 604. At operation 1012, the survey server 606 provides a video feed from the wearable device B 604 to the wearable device A 602.

Figure 11:
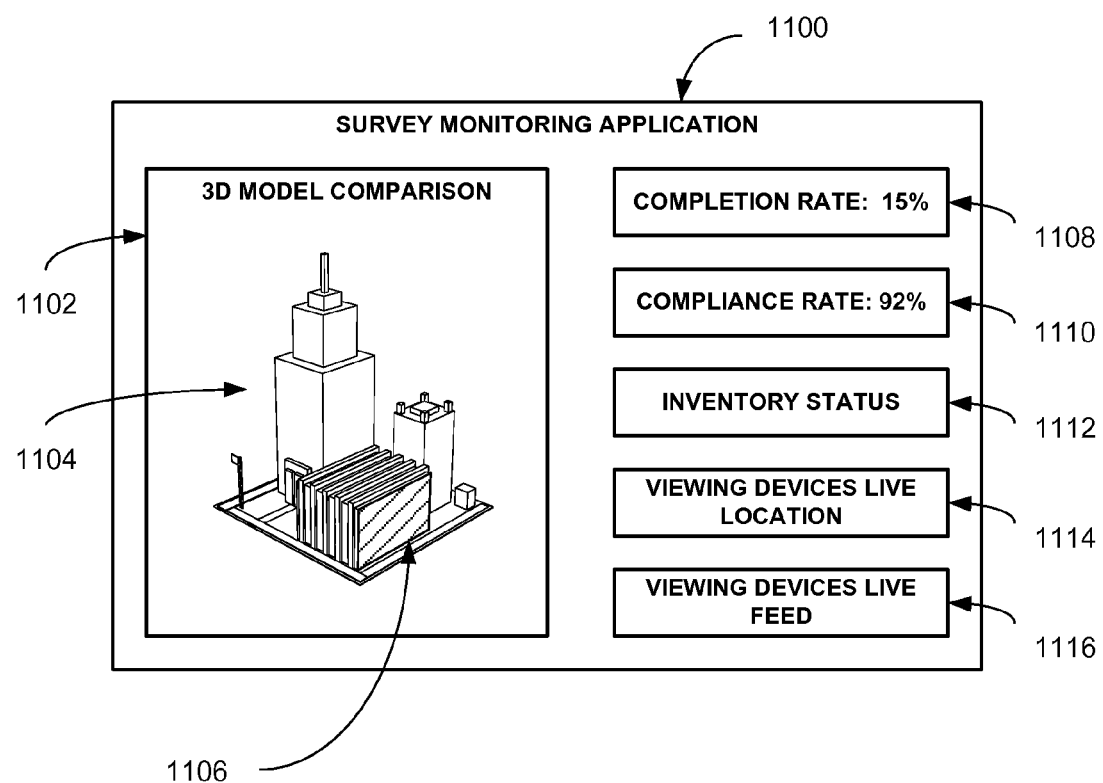
FIG. 11 is a block diagram illustrating an example screenshot of a survey monitoring application.

FIG. 11 is a block diagram illustrating an example screenshot 1100 of a survey monitoring application. The screenshot 1100 includes a display 1102 for a 3-D model comparison to compare the reference 3-D model 1104 to the reconstructed 3-D model 1106 represented by the shaded area. The screenshot 1100 may include a completion rate 1108, a compliance rate 1110, an inventory status 1112, a viewing device live location 1114, and a viewing device live feed 1116. The completion rate 1108 identifies the construction progress based on the 3-D model comparison. The compliance rate 1110 identifies the rate of compliance to references such as architectural and city codes. The viewing device live location 1114 identifies the location of the wearable devices within the 3-D model. The viewing device live feed 1116 enables a user of the survey monitoring application 1100 to view a live video feed from any of the wearable devices.

Figure 12:
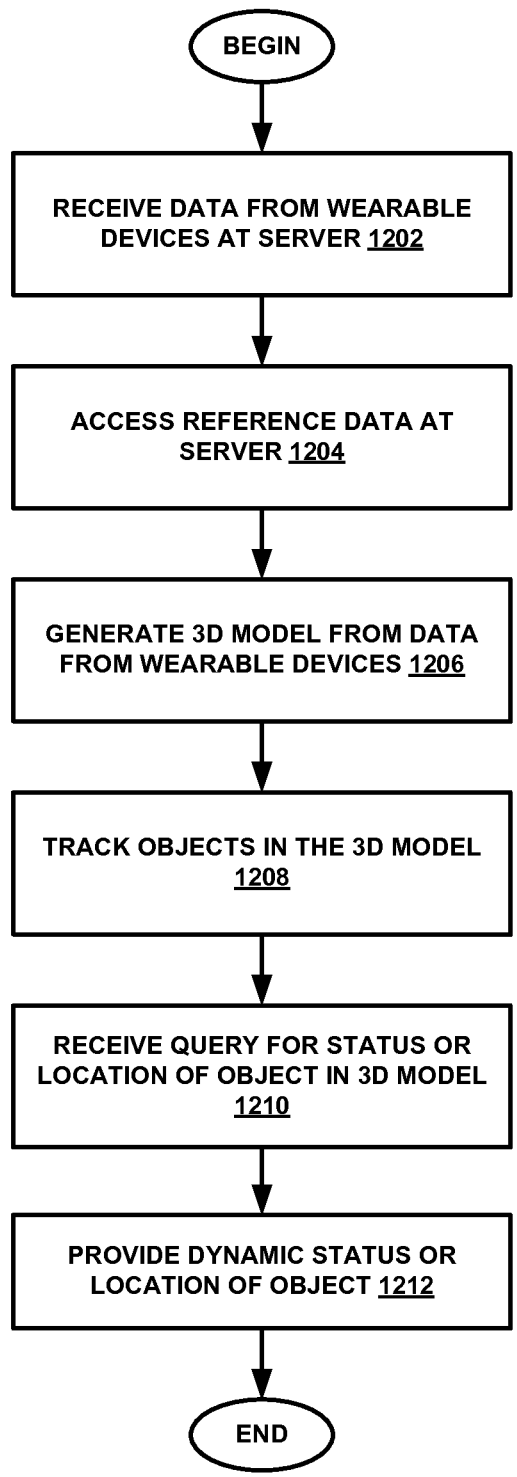
FIG. 12 is a flowchart illustrating an example operation for providing dynamic status or location.

FIG. 12 is a flowchart illustrating an example operation for providing dynamic status or location. At operation 1202, data (e.g. image frame, pictures, audio, location, orientation, user profile) is received from wearable devices at a survey server. At operation 1204, the survey server accesses reference data related to a physical object and the wearable devices within a distance threshold of the physical object. At operation 1206, a three-dimensional model is generated based on the data from the wearable devices. At operation 1208, the survey server identifies and tracks items/components in the three-dimensional model. At operation 1210, a query for the status or location of an item/component within the three-dimensional model is received. At operation 1212, the dynamics status or location of an identified item/component is provided.

Figure 13:
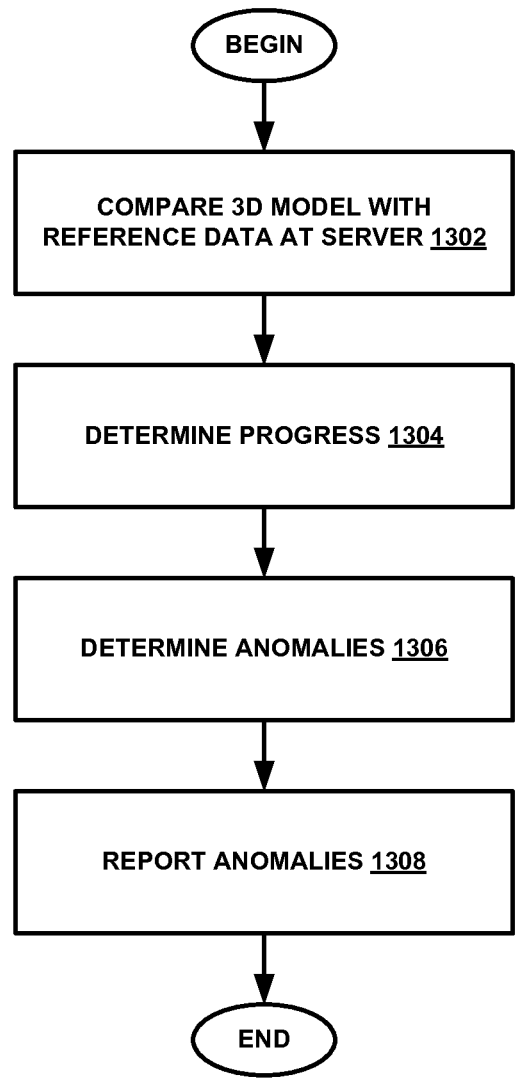
FIG. 13 is a flowchart illustrating an example operation for determining and reporting anomalies.

FIG. 13 is a flowchart illustrating an example operation for determining and reporting anomalies. At operation 1302, the three-dimensional model is compared with reference data at the survey server. At operation 1304, the survey server determines the progress of a project related to the physical object. The project may be for example, a construction of a high rise building, a demolition of a building, a construction of an industrial machine such as a car or a train. The progress may be identified using a phase or a stage identifier (e.g., phase n of a construction process). At operation 1306, anomalies are detected by comparing the reconstructed 3D model, identified items/components, with the reference data. For example, a door is mistakenly installed in another room. At operation 1308, anomalies are reported to the corresponding wearable devices or a monitoring client.

Figure 14:
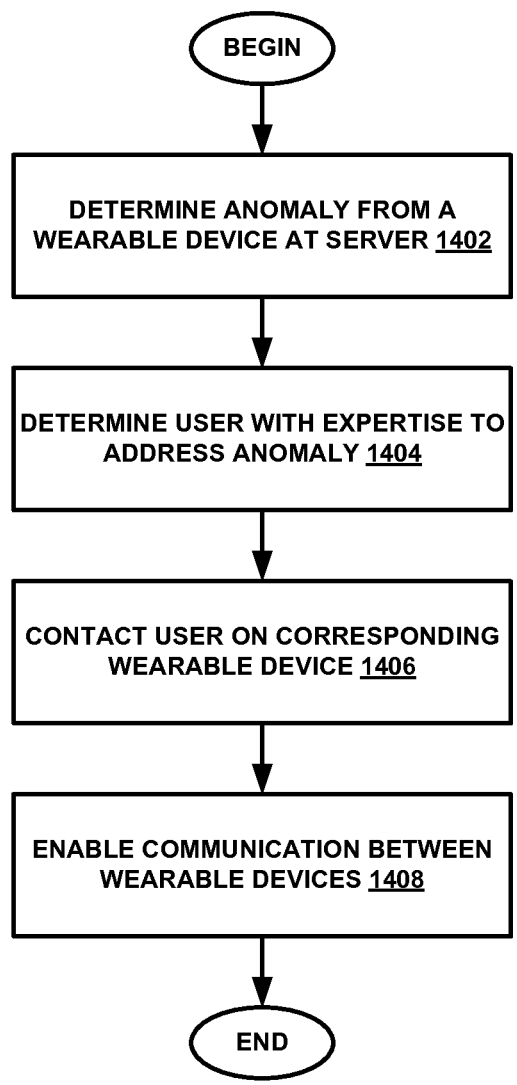
FIG. 14 is a flowchart illustrating an example operation for remote expert assistance.

FIG. 14 is a flowchart illustrating an example operation for remote expert assistance. At operation 1402, an anomaly is determined from a wearable device at a survey server. At operation 1404, the survey server identifies a user associated with a known technical expertise related to the anomaly. For example, if the anomaly is a wrongly placed electrical wiring, a user with electrical expertise may be summoned based on the detected electrical anomaly at operation 1406. At operation 1408, the survey server enables communications between the wearable devices of the identified expert and of the user with the identified anomaly.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
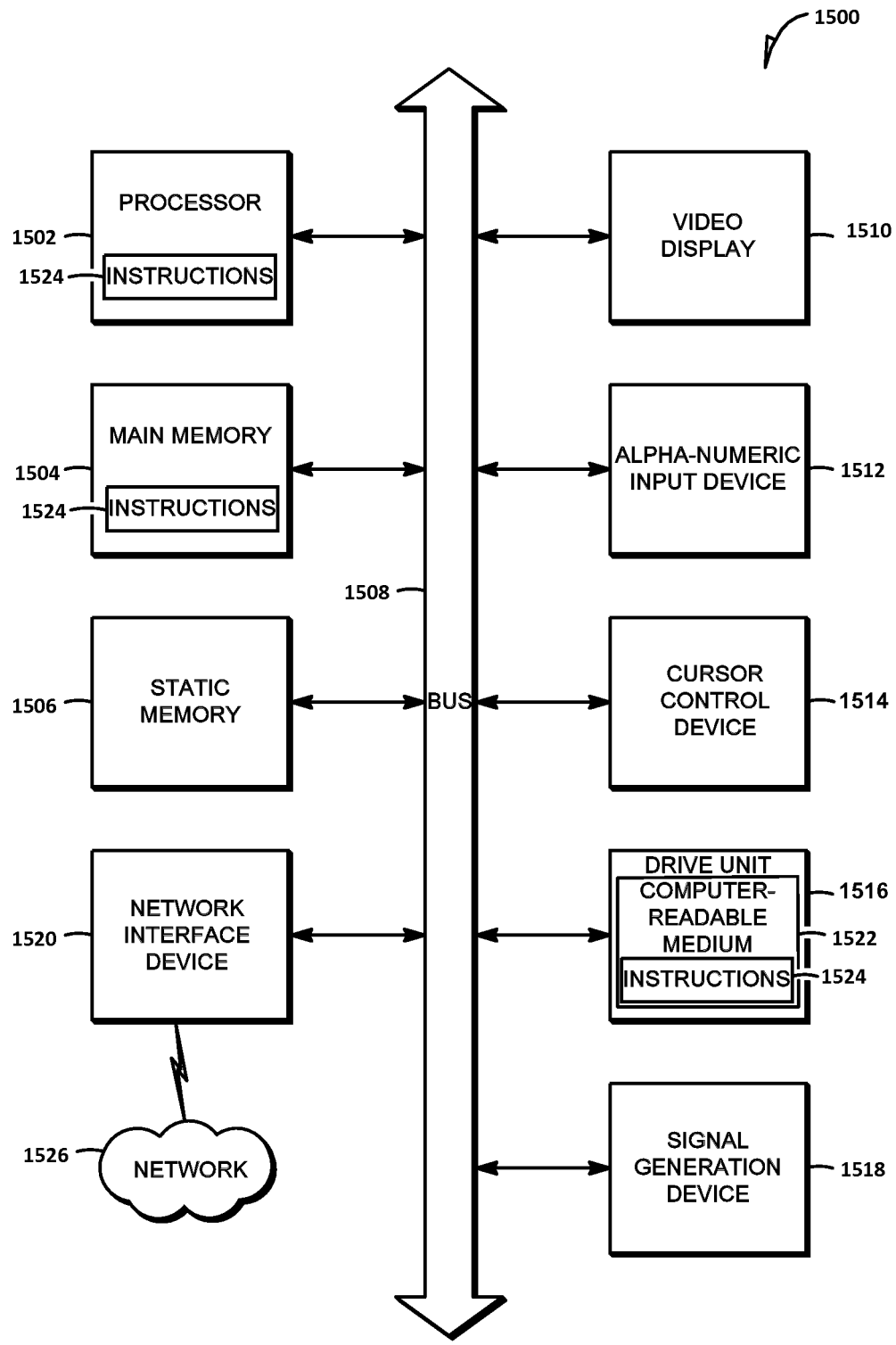
FIG. 15 is a block diagram illustrating components of a machine, according to some example embodiments, able to read instructions from a machine-readable medium and perform any one or more of the methodologies discussed herein.

FIG. 15 is a block diagram of a machine in the example form of a computer system 1500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a survey server 118 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media. The instructions 1524 may also reside, completely or at least partially, within the static memory 1506.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding or carrying instructions 1524 for execution by the machine and that cause the machine to perform any one or more of the methodologies of the present embodiments, or that is capable of storing, encoding or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1524 for execution by the machine, and includes digital or analog communications signals or other intangible media to facilitate communication of such software.

Example Mobile Device

Figure 16:
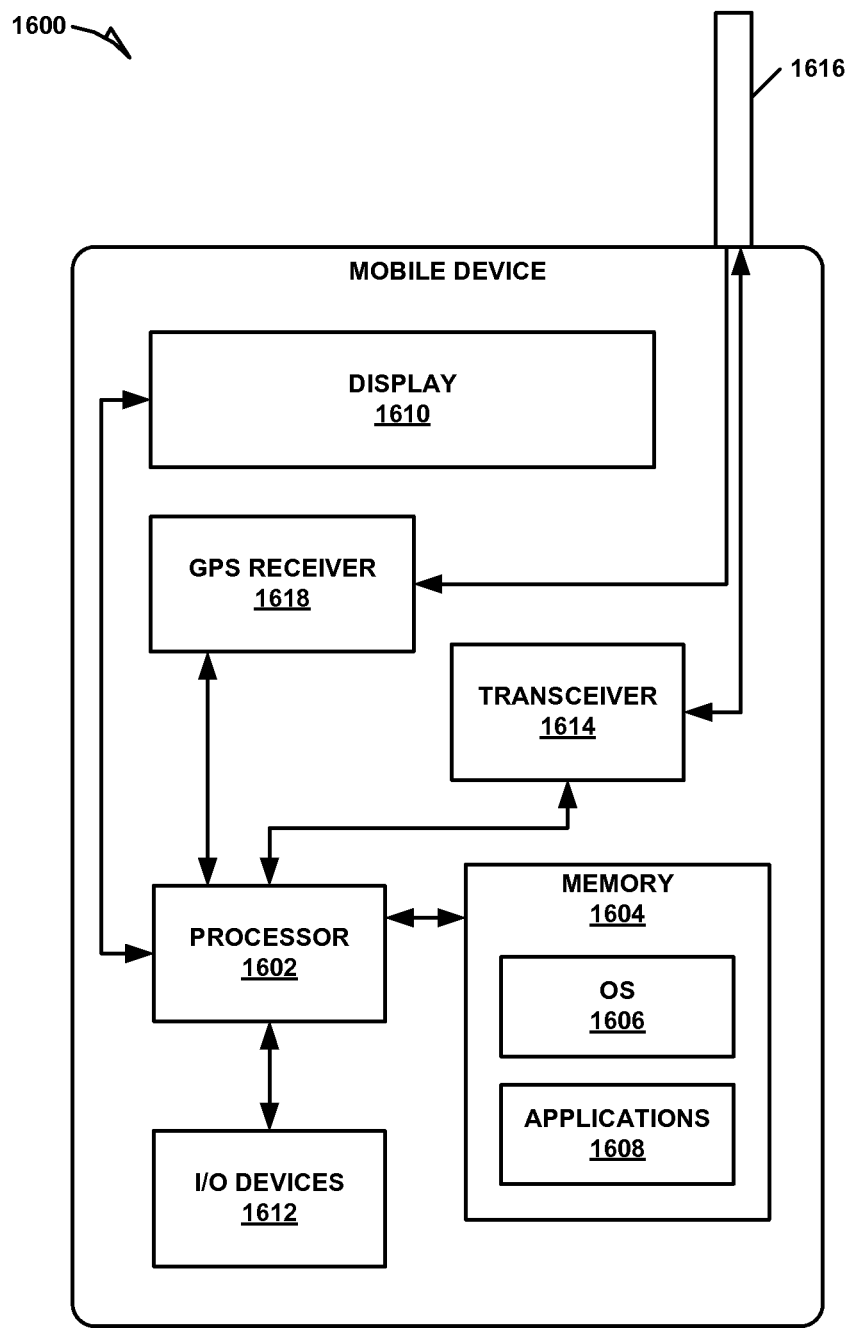
FIG. 16 is a block diagram illustrating a mobile device, according to an example embodiment.

FIG. 16 is a block diagram illustrating a mobile device 1600, according to an example embodiment. The mobile device 1600 may include a processor 1602. The processor 1602 may be any of a variety of different types of commercially available processors 1602 suitable for mobile devices 1600 (for example, an XScale architecture microprocessor, a microprocessor without interlocked pipeline stages (MIPS) architecture processor, or another type of processor 1602). A memory 1604, such as a random access memory (RAM), a flash memory, or other type of memory, is typically accessible to the processor 1602. The memory 1604 may be adapted to store an operating system (OS) 1606, as well as application programs 1608, such as a mobile location enabled application that may provide LBSs to a user 102. The processor 1602 may be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 may be coupled to a transceiver 1614 that interfaces with an antenna 1616. The transceiver 1614 may be configured to both transmit and receive cellular network signals, wireless data signals, or other types of signals via the antenna 1616, depending on the nature of the mobile device 1600. Further, in some configurations, a GPS receiver 1618 may also make use of the antenna 1616 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A server comprising:
a storage device storing instructions; and
a hardware processor communicatively coupled to the storage device and configured by the instructions to:
receive video feeds, location information, and orientation information from a plurality of wearable devices;
map an object and construct a three-dimensional model of the object using two-dimensional images captured from different angles and locations around the mapped object from the plurality of wearable devices, the three-dimensional model being constructed based on the video feeds, the location information, and the orientation information received from the plurality of wearable devices;
perform analytics from the video feeds to identify a manipulation on the object, to update the three-dimensional model of the object based on the manipulation on the object, and to generate a dynamic status of the object based on the manipulation on the object with respect to reference data related to the object, the dynamic status including a completion rate and a compliance rate, and the reference data comprising another three-dimensional model of a reference object, a reference process for completing the reference object, and a reference compliance related to the reference process;
store the reference data and the dynamic status identifying the wearable device associated with the manipulation on the object; and
detect and identify a non-compliance based on the manipulation on the object in relation to the reference compliance by: identifying a non-compliance of a first manipulation on the object, identifying a first wearable device corresponding to the first manipulation on the object, identifying a second wearable device associated with a second manipulation dependent on the first manipulation, and notifying the second wearable device of the non-compliance of the first manipulation on the object from the first wearable device.

2. The server of claim 1, wherein the manipulation of the object comprises a modification of an existing component on the object, an addition of a new component to the object, or a removal of an existing component on the object.

3. The server of claim 1, wherein the hardware processor is further configured by the instructions to perform object recognition on the video feeds actively or against the reference data to identify a component on the object or within a scene or a periphery from a wearable device.

4. The server of claim 1, wherein the dynamic status comprising an identification of a type of manipulation on the object, an identification of a tool used in the manipulation on the object, a location of the manipulation relative to the three-dimensional model of the object, and an identification of the wearable device associated with the manipulation on the object.

5. The server of claim 1, wherein the hardware processor is further configured by the instructions to:
update the dynamic status related to the manipulation on the object, the dynamic status identifying a completion status of the object with respect to the reference object;
keep an inventory of components on the object;
generate a history of manipulations of the components and corresponding wearable devices; and
enable communication between two or more wearable devices determined based on a corresponding manipulation of the object.

6. The server of claim 5, wherein to enable communication between two or more wearable devices determined based on the corresponding manipulation of the object, the hardware processor is configured by the instructions to identify the first wearable device corresponding to a first manipulation on the object, to identify a second wearable device associated with a second manipulation similar to the first manipulation, and to enable communication between the second wearable device and the first wearable device in response to receiving a request for assistance on the first manipulation on the object from the first wearable device.

7. The server of claim 1, wherein the hardware processor is further configured by the instructions to receive, from a client, a request for a location of a component related to the manipulation on the object, to identify and communicate the location of the component relative to the reference data to the client.

8. The server of claim 1, wherein the processor comprises an offload application configured to:
receive a request from the plurality of wearable devices to offload at least one of a tracking process and an augmented reality rendering process, the augmented reality rendering process based on an augmented reality database;
generate offloaded processed data based on the request and the location and the orientation of the wearable device; and
stream the offloaded processed data to the plurality of wearable devices in response to the request, the plurality of wearable devices configured to generate a visualization of the offloaded processed data in a corresponding display of the plurality of wearable devices.

9. A method comprising:
receiving video feeds, location information, and orientation information from a plurality of wearable devices;
mapping an object;
constructing a three-dimensional model of the object using two-dimensional images captured from different angles and locations around the mapped object from the plurality of wearable devices, the three-dimensional model being constructed based on the video feeds, location information, and orientation information received from the plurality of wearable devices;
performing analytics from the video feeds to identify a manipulation on the object, to update the three-dimensional model of the object based on the manipulation on the object, and to generate a dynamic status of the object based on the manipulation on the object with respect to reference data related to the object, the dynamic status including a completion rate and a compliance rate;
generating a survey of components associated with the three-dimensional model of the object;
storing the reference data and the dynamic status identifying the wearable device associated with the manipulation on the object in a storage device; and
enabling communication between two or more wearable devices determined based on a corresponding manipulation of the object by: identifying a first wearable device corresponding to a first manipulation on the object, identifying a second wearable device associated with a second manipulation similar to the first manipulation, and enabling communication between the second wearable device and the first wearable device in response to receiving a request for assistance on the first manipulation on the object from the first wearable device.

10. The method of claim 9, wherein the manipulation of the object comprises a modification of an existing component on the object, an addition of a new component to the object, or a removal of an existing component on the object.

11. The method of claim 9, further comprising:
performing object recognition on the video feeds actively or against the reference data to identify a component on the object or within a scene or a periphery from a wearable device.

12. The method of claim 9, wherein the dynamic status comprises an identification of a type of manipulation on the object, an identification of a tool used in the manipulation on the object, a location of the manipulation relative to the three-dimensional model of the object, and an identification of the wearable device associated with the manipulation on the object.

13. The method of claim 9, wherein the reference data comprises a three-dimensional model of a reference object, a reference process for completing the reference object, and a reference compliance related to the reference process.

14. The method of claim 13, further comprising:
updating the dynamic status related to the manipulation on the object, the dynamic status identifying a completion status of the object with respect to the reference object;
detecting and identifying a non-compliance based on the manipulation on the object in relation to the reference compliance;
keeping an inventory of components on the object; and
generating a history of manipulations of the components and corresponding wearable devices.

15. The method of claim 14, further comprising:
identifying a non-compliance of a first manipulation on the object;
identifying the first wearable device corresponding to the first manipulation on the object;
identifying a second wearable device associated with a second manipulation dependent on the first manipulation; and
notifying the second wearable device of the non-compliance of the first manipulation on the object from the first wearable device.

16. The method of claim 9, further comprising:
receiving, from a client, a request for a location of a component related to the manipulation on the object; and
identifying and communicating the location of the component relative to the reference data to the client.

17. A non-transitory machine-readable medium comprising instructions that, when executed by one or more processors of a machine, cause the machine to perform operations comprising:
receiving video feeds, location information, and orientation information from a plurality of wearable devices;
mapping an object;
constructing a three-dimensional model of the object using two-dimensional images captured from different angles and locations around the mapped object, the three-dimensional model being constructed based on the video feeds, location information, and orientation information received from the plurality of wearable devices;
performing analytics from the video feeds to identify a manipulation on the object, to update the three-dimensional model of the object based on the manipulation on the object, and to generate a dynamic status of the object based on the manipulation on the object with respect to reference data related to the object, the dynamic status including a completion rate and a compliance rate;
generating a survey of components associated with the three-dimensional model of the object;
storing the reference data and the dynamic status identifying the wearable device associated with the manipulation on the object in a storage device; and
enabling communication between two or more wearable devices determined based on a corresponding manipulation of the object by: identifying a first wearable device corresponding to a first manipulation on the object, identifying a second wearable device associated with a second manipulation similar to the first manipulation, and enabling communication between the second wearable device and the first wearable device in response to receiving a request for assistance on the first manipulation on the object from the first wearable device.

* * * * *